United States Patent Office.

PHILIPP FREEDRICH LENHART, OF BROOKLYN, NEW YORK.

Letters Patent No. 104,861, dated June 28, 1870.

IMPROVEMENT IN WATER-PROOF SWEAT-BANDS FOR HATS AND CAPS.

The Schedule referred to in these Letters Patent and making part of the same.

*To all whom it may concern:*

Be it known that I, PHILIPP FREEDRICH LENHART, of Brooklyn, in the county of Kings and State of New York, have invented a new and useful Improvement in Hat and Cap-Sweats; and I do hereby declare that the following is a full, clear, and exact description thereof, which will enable others skilled in the art to make and use the same.

This invention has for its object to improve the sweat-bands of hats and caps in such manner that the same will be more convenient and less injurious to health than those now in use.

The invention consists in a novel treatment of the leather for the purpose of making the same water-proof and still an absorbent of moisture.

As at present made, hat-bands are covered, on their inner sides, with japan, so that the same produces a smooth surface in contact with the skin. The japan prevents, however, the moisture from being absorbed by the leather, and lets the same either flow down to the body of the hat or keeps it on the face of the wearer. It consequently prevents continuous and healthy perspiration.

My invention consists, first in making the outer side of the sweat-band water-proof by a proper coating of water-proof substances, and in leaving the natural surface of the leather in contact with the skin of the wearer. The leather will thereby absorb the moisture from the skin without letting it strike through the body of the hat.

The invention consists also in the composition for and method of preparing the water-proof outer surface of the leather.

The process is as follows:

The leather is, after having been tanned, painted on the flush side with a mixture of linseed oil and starch, whereby its pores are closed. The coating, when dry, is rubbed or polished down to become quite smooth, and is finally covered with a coat of japan, whereby it becomes entirely water-proof. The japan can be of suitable color.

Having thus described my invention,

I claim as new and desire to secure by Letters Patent—

1. A sweat-band, made water-proof on the outer and left porous on the inner side, substantially as herein set forth.

2. The herein-described method of preparing a composition for covering sweat-bands to make them water-proof, as set forth.

PHILIPP FREEDRICH LENHART.

Witnesses:
 GEO. W. MABEE,
 ALEX. F. ROBERTS.